US012785227B2

(12) United States Patent
Ma et al.

(10) Patent No.: US 12,785,227 B2
(45) Date of Patent: Nov. 3, 2026

(54) JOINING OF EXTERNAL TABS OF ELECTRODES OF BATTERY CELLS TO TERMINALS USING PULSED LASER

(71) Applicant: GM GLOBAL TECHNOLOGY OPERATIONS LLC, Detroit, MI (US)

(72) Inventors: Junjie Ma, Novi, MI (US); Masoud Mohammadpour, Novi, MI (US); Teresa Jean Rinker, Royal Oak, MI (US); Blair E. Carlson, Ann Arbor, MI (US); Jennifer Therese Bracey, Holly, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 709 days.

(21) Appl. No.: 18/343,482

(22) Filed: Jun. 28, 2023

(65) Prior Publication Data

US 2025/0007125 A1 Jan. 2, 2025

(51) Int. Cl.
*H01M 50/566* (2021.01)
*H01M 50/553* (2021.01)

(52) U.S. Cl.
CPC ....... *H01M 50/566* (2021.01); *H01M 50/553* (2021.01)

(58) Field of Classification Search
CPC . H01M 50/204; H01M 50/553; H01M 50/566
See application file for complete search history.

(56) References Cited

U.S. PATENT DOCUMENTS

2018/0175336 A1* 6/2018 Russ ...................... H01G 11/76
2021/0399270 A1* 12/2021 Peng ...................... H01M 4/13
2022/0126399 A1 4/2022 An et al.

FOREIGN PATENT DOCUMENTS

DE 10 2016 225 252 A1 6/2018
DE 10 2021 110 804 A1 5/2022
DE 10 2022 105 775 A1 10/2022

OTHER PUBLICATIONS

Office Action dated Feb. 15, 2024 from German Patent Office for German Patent No. 10 2023 127 367.1; 7 pages.

* cited by examiner

*Primary Examiner* — Christopher P Domone

(57) ABSTRACT

A method for joining external tabs of a battery cell to a terminal includes providing a battery cell stack including C cathode electrodes, A anode electrodes, and S separators, where C, S and A are integers greater than one. The method includes arranging a stack of external tabs of one of the C cathode electrodes and the A anode electrodes on a terminal; and laser welding W weld segments in each of L weld locations on the stack of external tabs of one of the C cathode electrodes and the A anode electrodes to join the external tabs of the one of the C cathode electrodes and the A anode electrodes to the terminal, where W and L are integers greater than one.

20 Claims, 5 Drawing Sheets

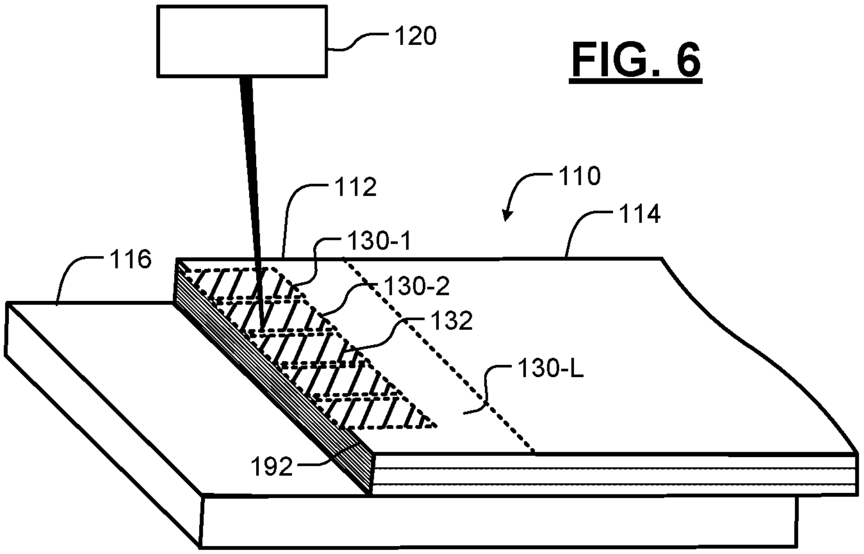
FIG. 6
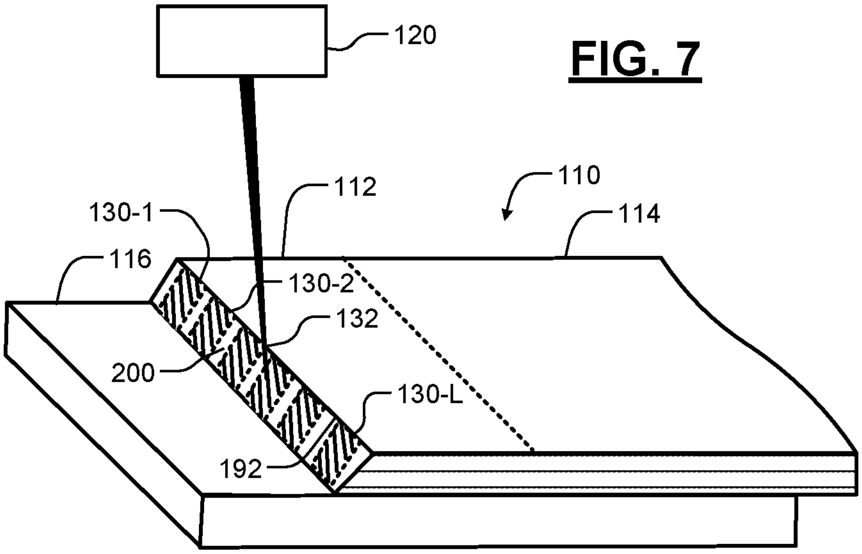
FIG. 7
FIG. 8
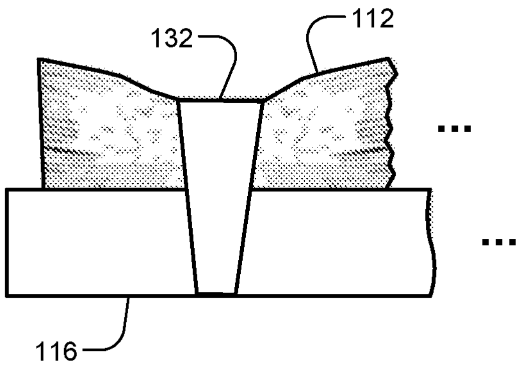

JOINING OF EXTERNAL TABS OF ELECTRODES OF BATTERY CELLS TO TERMINALS USING PULSED LASER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery cells, and more particularly to joining of external tabs of electrodes of battery cells to terminals using pulsed laser.

Electric vehicles (EVs) such as battery electric vehicles (BEVs), hybrid vehicles, and/or fuel cell vehicles include one or more electric machines and a battery system including one or more battery cells, modules, and/or packs. A power control system is used to control charging and/or discharging of the battery system during charging and/or driving.

SUMMARY

A method for joining external tabs of a battery cell to a terminal includes providing a battery cell stack including C cathode electrodes each including a cathode current collector, a cathode active layer arranged on the cathode current collector, and an external tab extending from the cathode current collector, A anode electrodes including an anode current collector, an anode active layer arranged on the anode current collector, and an external tab extending from the anode current collector, and S separators, where C, S and A are integers greater than one. The method includes arranging a stack of the external tabs of one of the C cathode electrodes and the A anode electrodes on a terminal; and laser welding W weld segments in each of L weld locations on the stack of external tabs of one of the C cathode electrodes and the A anode electrodes to join the external tabs of the one of the C cathode electrodes and the A anode electrodes to the terminal, where W and L are integers greater than one.

In other features, for each of the L weld locations, the W weld segments are arranged parallel to one another in a first diagonal direction. For each of the L weld locations, the W weld segments include a first group arranged parallel to one another in a first diagonal direction and a second group arranged parallel to one another in a second diagonal direction and overlapping the first group. For each of the L weld locations, the W weld segment are arranged parallel to one another in a first direction parallel to an outer edge of the stack including the external tabs. For each of the L weld locations, the W weld segment are arranged parallel to one another in a first direction perpendicular to an outer edge of the stack including the external tabs.

In other features, for each of the L weld locations, the W weld segments include a first group arranged parallel to one another in a first direction parallel to an outer edge of the stack including the external tabs and a second group arranged parallel to one another in a second direction perpendicular to the outer edge of the stack including the external tabs and overlapping the first group. The L weld locations are arranged in a row located parallel to and spaced from an outer edge of the stack including the external tabs. The L weld locations are arranged in a row located parallel to and overlapping an outer edge of the stack including the external tabs.

In other features, the W weld segments in each of the L weld locations are created in a predetermined sequence without sequentially welding immediately adjacent ones of the W weld segments in each of the L weld locations. The L weld locations are created on the stack of external tabs in a predetermined sequence without sequentially welding immediately adjacent ones of the L weld locations. The L weld locations are created in a predetermined sequence including laser welding outer ones of the L weld locations before laser welding inner ones of the L weld locations.

In other features, the stack of external tabs is trimmed at an acute angle to form a sloped edge, and the L weld locations are arranged in a row along the sloped edge. At least one of the anode current collector of the A anode electrodes and the cathode current collector of the C cathode electrodes is made of foil.

A battery cell comprises a terminal. A battery cell stack includes C cathode electrodes each including a cathode current collector, a cathode active layer arranged on the cathode current collector, and an external tab extending from the cathode current collector, A anode electrodes including an anode current collector, an anode active layer arranged on the anode current collector, and an external tab extending from the anode current collector, and S separators, where C, S and A are integers greater than one. A stack of the external tabs of one of the C cathode electrodes and the A anode electrodes is laser welded to the terminal. A laser weld between the stack of external tabs of one of the C cathode electrodes and the A anode electrodes and the terminal includes W weld segments in each of L weld locations, where W and L are integers greater than one.

In other features, for each of the L weld locations, the W weld segments are arranged parallel to one another in at least one of a first diagonal direction and a second diagonal direction. For each of the L weld locations, the W weld segment are arranged parallel to one another in a first direction at least one of parallel and perpendicular to an outer edge of the stack including the external tabs of the one of the C cathode electrodes and the A anode electrodes. The L weld locations are arranged in a row located parallel to and spaced from an outer edge of the stack including the external tabs. The L weld locations are arranged in a row located parallel to and overlapping an outer edge of the stack including the external tabs.

In other features, the stack of external tabs is trimmed at an acute angle to form a sloped edge, and the L weld locations are arranged in a row along the sloped edge. At least one of the anode current collector of the A anode electrodes and the cathode current collector of the C cathode electrodes is made of foil.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 6 and 7 are perspective views illustrating examples of methods for joining the stacks of external tabs to the terminals according to the present disclosure; and FIG. 8 is a side cross sectional view illustrating one of the weld segments joining the stack of external tabs and the terminal according to the present disclosure.

In the drawings, reference numbers may be reused to identify similar and/or identical elements.

DETAILED DESCRIPTION

While battery cells including laser welded terminals are shown in the context of electric vehicles, the battery cells including laser welded terminals can be used in stationary applications and/or other applications.

The present disclosure addresses quality issues of welds between external tabs extending from current collectors of anode electrodes and/or cathode electrodes and terminals of a battery cell. In some examples, the terminals correspond to internal terminals of the battery cell that are in contact with external terminals of the battery cell. In other words, the external terminals are in contact with the internal terminals that are laser welded to the external tabs of the cathode electrodes and/or anode electrodes.

When welding multiple layers of external tabs (e.g., external tabs extending from current collectors made of foil) in a lap joint, the weld may be porous and detachments may occur at a boundary of fusion. The present disclosure relates to methods for joining external tabs of electrodes of battery cells at multiple weld locations. Each weld location includes weld segments formed by a series of short laser pulses. The weld segments are created in a predetermined weld sequence and arranged in a predetermined weld pattern. Using the predetermined weld sequence and/or pattern helps to manage heat generated during the welding and reduce interaction time between the laser beam and the material. This approach also reduces shrinkage and minimizes detachment in a seam area of the lap joint. The energy, frequency, speed, and location of pulsed laser beam are optimized to provide enough energy to penetrate through the stack of external tabs and the terminal to create a robust weld seam while preventing detachment and/or reducing thermal distortion. In some examples, each of the weld segments 132 is shorter than a width, height, or diagonal length of an outer border of the weld location 130. In some examples, an outer border of the weld location 130 is rectangular, although other border shapes can be used.

Figure 1A:
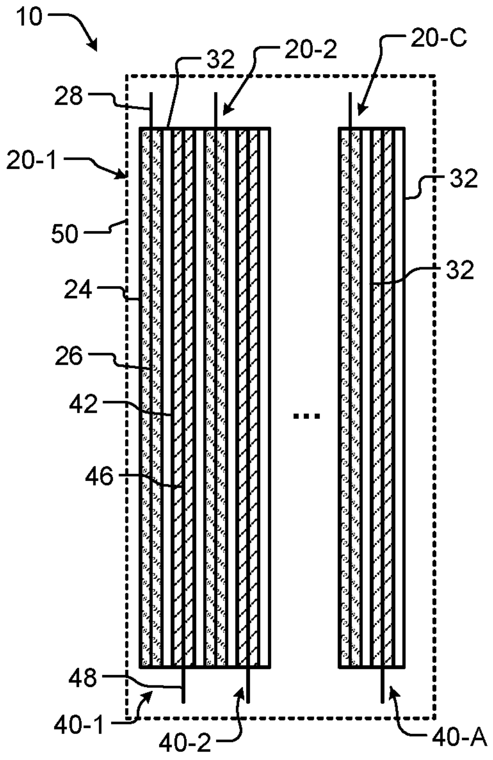
FIG. 1A is a side cross sectional view of an example of a battery cell including cathode electrodes, anode electrodes, and separators according to the present disclosure.

Referring now to FIG. 1A, a battery cell 10 includes C cathode electrodes 20, A anode electrodes 40, and S separators 32 arranged in a predetermined sequence in a stack 12 arranged in an enclosure 50, where A, C, and S are integers greater than one. The C cathode electrodes 20-1, 20-2, . . . , and 20-C (where C is an integer greater than one) include cathode active material layers 24 arranged on one or both sides of cathode current collectors 26. The A anode electrodes 40-1, 40-2, . . . , and 40-A (where A is an integer greater than one) include anode active material layers 42 arranged on one or both sides of the anode current collectors 46. In some examples, the S separators 32 are arranged between the C cathode electrodes 20 and the A anode electrodes 40.

The C cathode electrodes 20 and the A anode electrodes 40 include external tabs 28 and 48, respectively, that correspond to portions of the cathode current collectors 26 and the anode current collectors 46 that extend beyond the cathode active material layer 24 and the anode active material layer 42, respectively. In some examples, the external tabs 28 of the C cathode electrodes 20 are laser welded to a first terminal and the external tabs 48 of the A anode electrodes 40 are laser welded to a second terminal as will be described further below. In some examples, the terminals are internal terminals that are connected to external terminals of the battery cell. The external tabs 28 and 48 in FIG. 1A can extend by a longer distance if needed for laser welding or other purposes.

The external tabs 28 and 48 can include a single external tab per current collector or multiple external tabs per current collector to provide redundant connection(s). The external tabs 28 and 48 can extend the width of the current collectors or only a portion of the width of the current collectors.

In some examples, the cathode current collectors 26 and the anode current collectors 46 comprise foil layers. In some examples, the cathode current collector 26 and the anode current collectors 46 are made of one or more materials selected from a group consisting of copper, stainless steel, brass, bronze, zinc, aluminum, and alloys thereof. In some examples, the cathode active material layers 24 and/or the anode active material layers 46 comprise a coating on one or both sides of the cathode current collector 26 and the anode current collectors 46, respectively. The coating may include one or more active materials, one or more conductive fillers/additives, and/or one or more binder materials. In some examples, the electrodes are manufactured by applying a slurry to coat the current collectors in a roll-to-roll manufacturing process.

Figure 1B:
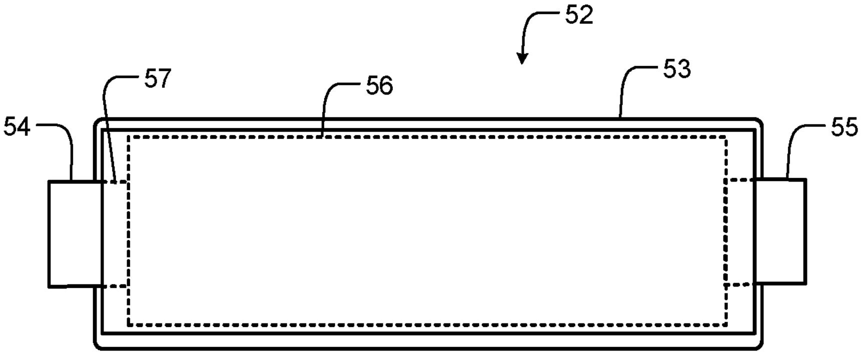
FIG. 1B is a side view of an example of a pouch battery cell according to the present disclosure.

Referring now to FIG. 1B, a pouch battery cell 52 includes a pouch enclosure 53 including a stack 56. As will be described further below, external tabs 57 of the anode and cathode electrodes are laser welded to terminals 54 and 55, respectively, that extend through the pouch enclosure 53.

Figure 1C:
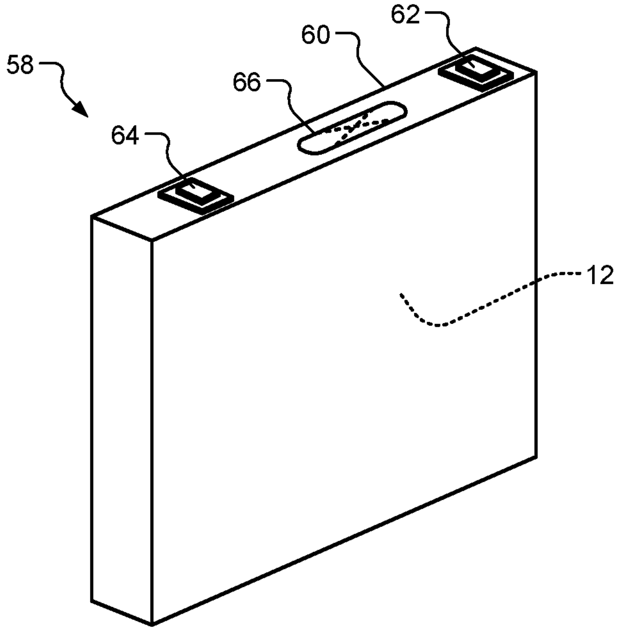
FIG. 1C is a perspective view of an example of a prismatic battery according to the present disclosure.

Referring now to FIG. 1C, the battery cell may be a prismatic battery cell 58 that includes an enclosure 60. While a prismatic battery cell is shown for purposes of illustration, other types of battery cells may be used. In some examples, the enclosure 60 has rectangular cross-sections in x-, y- and z-axis planes. The prismatic battery cell 58 includes external terminals 62 and 64 and a vent cap 66. The stack 12 of the C cathode electrodes 20, the A anode electrodes 40, and the S separators 32 is arranged in the enclosure 60. As will be described further below, the external tabs 28 and 48 of the cathode current collectors and/or the anode current collectors are laser welded to the corresponding terminals. In some examples, the terminals are arranged in contact with the external terminals 62 and 64 of the battery cell 10 to provide external connections to the anode electrodes and cathode electrodes.

Figure 1D:
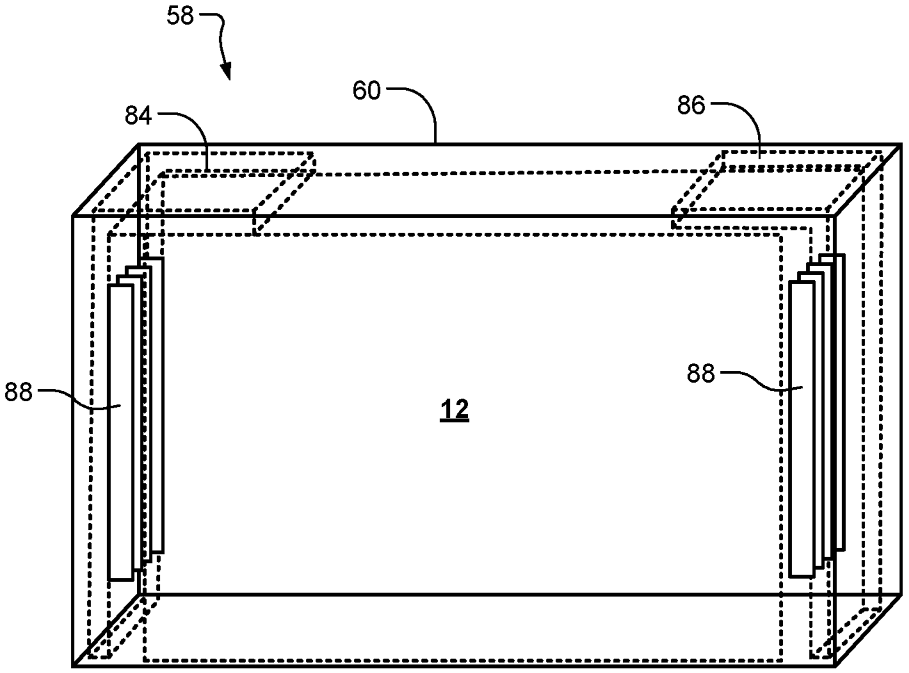
FIG. 1D is a side cross sectional view of an example of internal and external terminals of a prismatic battery cell according to the present disclosure.

Referring now to FIG. 1D, examples of internal terminals 84 and 86 of a prismatic battery cell are shown in the enclosure 60. The stack 12 of the A anode electrodes or the C cathode electrodes include external tabs 88. The external tabs 88 of the A anode electrodes and/or the C cathode electrodes are optionally folded and laser welded to the internal terminals 84 and 86, respectively, as will be described further below. While the internal terminals 84 and 86 are shown as "L"-shaped terminals, planar terminals or terminals having other shapes can be used.

Figure 2:
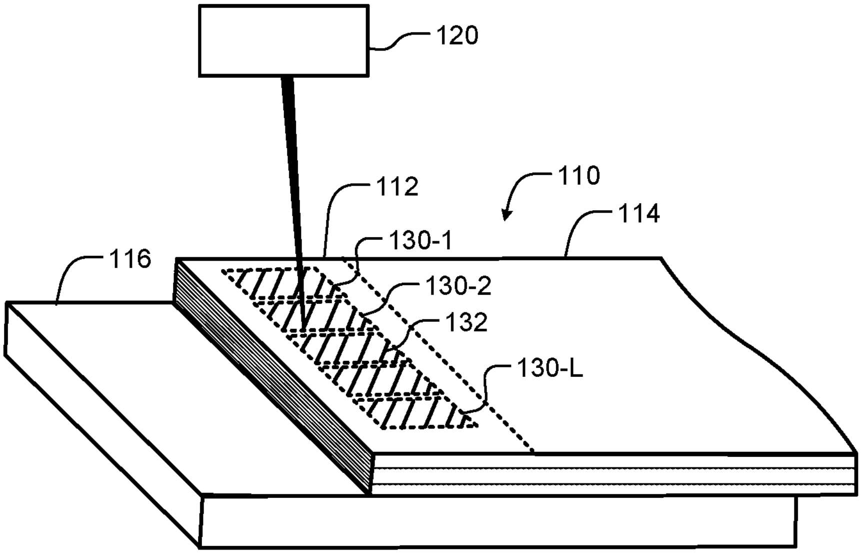
FIG. 2 is a perspective view illustrating an example of a method for joining a stack of external tabs of cathode or anode electrodes to a terminal according to the present disclosure.

Referring now to FIG. 2, a stack 110 includes the C cathode electrodes 20, A anode electrodes 40, and S separators 32 as described above. The stack 110 includes a stack of external tabs 112 that extend from current collectors of the anode electrodes or the cathode electrodes. The stack of external tabs 112 are located adjacent to active material regions 114 of the anode electrodes or the cathode electrodes. The stack of external tabs 112 are arranged on a terminal 116 such as an internal or external terminal of a battery cell.

A laser 120 directs short laser pulses onto the stack of external tabs 112 of the anode or cathode electrodes to create weld segments 132 of a plurality of weld locations 130-1, 130-2, . . . , and 130-L (collectively or individually referred to as weld locations 130), where L is an integer greater than zero. In some examples, the weld locations 130 are aligned in a row on the stack of external tabs 112 across a width of the stack 110. Alternately, the weld locations 130 can include an array of weld locations including more than one row. In still other examples, the weld locations 130 can be arranged in other regular or irregular patterns.

Each of the weld locations 130 includes the plurality of weld segments 132 arranged in a predetermined pattern. For example in FIG. 2, the plurality of weld segments 132 include P diagonally oriented laser pulse welds, where P is an integer (e.g., P=5). The laser 120 heats and melts the weld segments 132 at the weld locations 130 and joins the stack of external tabs 112 to the terminal 116.

In some examples, the laser 120 or another laser (not shown) performs an initial pass using different laser welding parameters or a different laser to preheat the weld segments and/or the weld locations before laser welding is performed. Examples of laser operating parameters that can be varied for preheating and/or laser welding include laser power, laser scan speed, laser oscillation pattern, laser focus/defocus, workpiece speed, pulse frequency, and/or pulse shape. Using a different laser and/or changing the laser operating parameters can be used to change the amount of heating that occurs in a given location during pre-heating as compared to welding.

Figure 3:
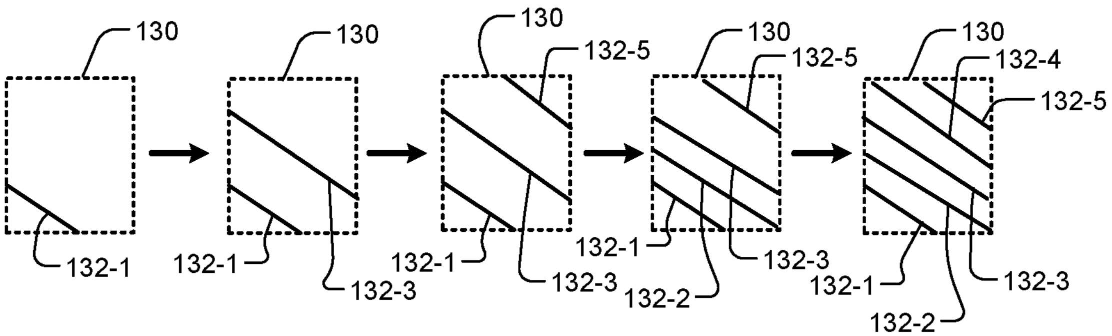
FIG. 3 illustrates an example of a weld sequence for creating weld segments at a weld location according to the present disclosure.

Referring now to FIG. 3, a welding sequence in one of the weld locations 130 is shown. In some examples, the weld segments 132 are welded in a non-sequential fashion. For example, the weld location 130 includes weld segments 132-1, 132-2, 132-3, 132-4, and 132-5 that are arranged in order from −1 to −5 from the bottom left to the top right of the weld location. In some examples, the weld sequence according to the present disclosure creates the weld segments non-sequentially such that two adjacent weld segments are not welded sequentially. This approach reduces overheating, distortion and/or shrinkage by spreading heat in the external tabs and the terminals. For example, the non-sequential weld sequence creates the weld segments in odd number weld locations from the bottom left to the top right and then creates the weld segments in even number locations from the bottom left to the top right.

Figure 4:
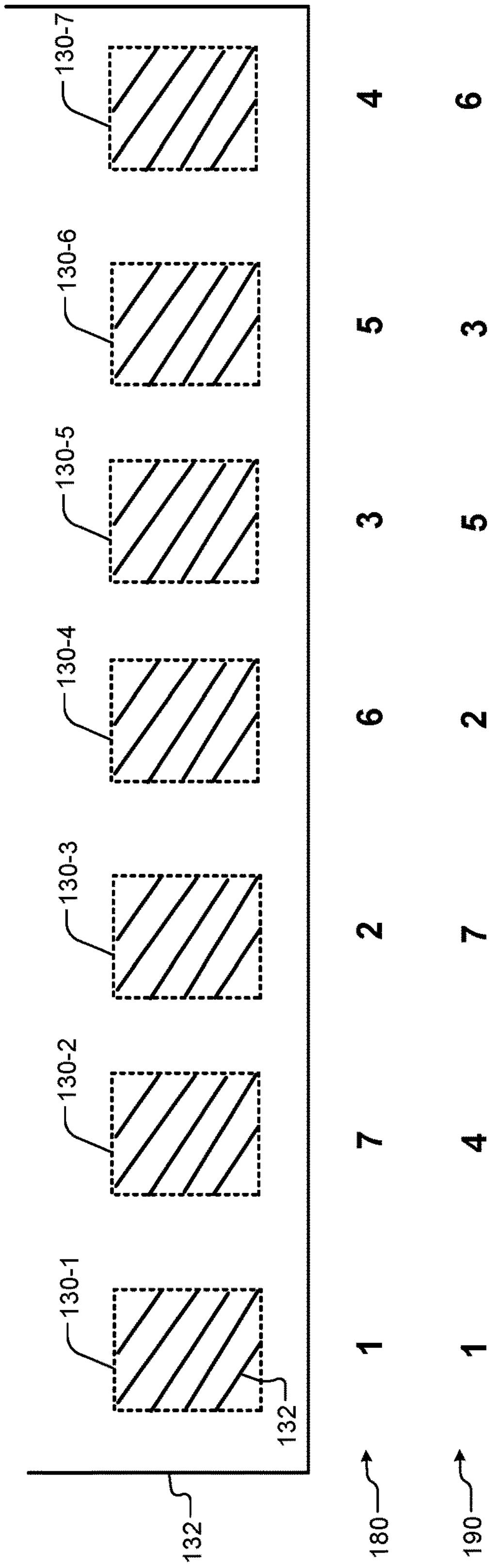
FIG. 4 illustrates other examples of weld sequences for creating weld locations to join a stack of external tabs of cathode or anode electrodes to a terminal according to the present disclosure.

Referring now to FIG. 4, a sequence for laser welding the weld locations 130-1, 130-2, . . . , and 130-L is shown, where L is an integer greater than 2. In this example, L=7 although L can be set equal to other integers. In some examples, adjacent ones of the weld locations 130 are welded in a non-sequential order. In a first weld sequence at 180, the weld segments 132 in the weld locations 130 are created by alternating between outermost weld locations before alternating between the next innermost weld locations and so on. In some examples, the weld segments in the weld locations 130 are performed in the following order: 130-1, 130-7, 130-2, 130-6, 130-3, 130-5 and 130-4.

In a second weld sequence at 190, the weld segments 132 in the weld locations 130 are performed from an outermost weld location on one side to a middle weld location, to an outermost weld location on the other side to a middle weld location, etc. In some examples, the weld segments in the weld locations 130 are performed in the following order: 130-1, 130-4, 130-7, 130-2, 130-5, 130-3 and 130-4. As can be appreciated, other laser weld sequences of the weld locations and/or weld segments can be performed.

Figure 5A:
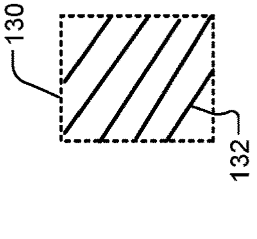
FIGS. 5A to 5F are examples of weld patterns for the weld segments at each of the welding locations according to the present disclosure.
Figure 5B:
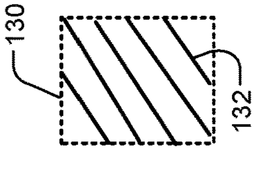
Figure 5C:
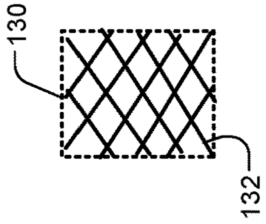

Referring now to FIGS. 5A to 5F, different arrangements of the weld segments 132 at the weld locations 130 are shown. In FIG. 5A, the weld segments 132 in the weld location 130 extend diagonally and in parallel from a left side upwardly to a right side of the weld location. In some examples, the weld segments extend diagonally at a predetermined angle in a range from 30° to 60° (e.g., 45°) relative to an outer edge 192 of the stack of external tabs 112. In FIG. 5B, the weld segments 132 in the weld location 130 extend diagonally and in parallel from a right side upwardly to a left side of the weld location. In FIG. 5C, the weld segments 132 in the weld location 130 extend diagonally in two directions to create a cross-hatched pattern.

Figure 5D:
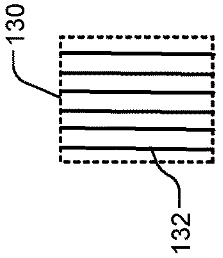
Figure 5E:
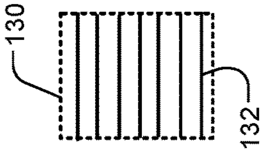
Figure 5F:
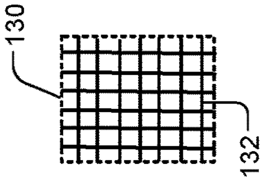

In FIG. 5D, the weld segments 132 in the weld location 130 extend in a first direction (e.g., perpendicular relative to the outer edge 192 of the stack of external tabs 112) and are parallel to one another. In FIG. 5E, the weld segments 132 in the weld location 130 extend in a second direction (e.g., parallel relative to the outer edge 192 of the stack of external tabs 112) and are parallel to one another. In FIG. 5F, the weld segments 132 in the weld location 130 extend in the first direction and in the second direction (transverse to the first direction) to create a cross-hatched pattern.

The weld locations can be arranged within outer edges of the stack of external tabs as shown in FIG. 2. In other examples, the weld locations can be arranged between the outer edge 192 of the stack of external tabs 112 112 and an edge of the active material layer 114 as shown in FIG. 6. In other examples, the stack of external tabs 112 can be trimmed at an acute angle along the outer edge 192 of the stack of external tabs 112 to form a sloped edge 200. The weld locations 130 are located along the sloped edge 200 of the stack of external tabs 112 as shown in FIG. 7.

Referring now to FIG. 8, a cross section at one of the weld segments 132 is shown. Penetration of the weld at the weld segments 132 extends partially or fully through the thickness of the terminal 116 ensuring a robust weld.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A method for joining external tabs of a battery cell to a terminal, comprising:

providing a battery cell stack including:

C cathode electrodes each including a cathode current collector, a cathode active layer arranged on the cathode current collector, and an external tab extending from the cathode current collector;

A anode electrodes including an anode current collector, an anode active layer arranged on the anode current collector, and an external tab extending from the anode current collector; and S separators, where C, S and A are integers greater than one; and arranging a stack of the external tabs of one of the C cathode electrodes and the A anode electrodes on a terminal; and laser welding W weld segments in each of L weld locations on the stack of external tabs of one of the C cathode electrodes and the A anode electrodes to join the external tabs of the one of the C cathode electrodes and the A anode electrodes to the terminal, where Wand L are integers greater than one, wherein each of the L weld locations are spaced apart from each other and include an outer border, wherein the W weld segments within each of the L weld locations are confined within the outer border of the respective one of the L weld locations and spaced apart from each other, wherein an entire length of each of the W weld segments extends through each external tab in the stack of external tabs of the one of the C cathode electrodes and the A anode electrodes.

2. The method of claim 1, wherein, for each of the L weld locations, the W weld segments are arranged parallel to one another in a first diagonal direction and extend between at least two sides of the outer border.

3. The method of claim 1, wherein, for each of the L weld locations, the W weld segments include a first group arranged parallel to one another in a first diagonal direction and a second group arranged parallel to one another in a second diagonal direction and overlapping the first group.

4. The method of claim 1, wherein, for each of the L weld locations, the W weld segment are arranged parallel to one another in a first direction parallel to an outer edge of the stack including the external tabs.

5. The method of claim 1, wherein, for each of the L weld locations, the W weld segment are arranged parallel to one another in a first direction perpendicular to an outer edge of the stack including the external tabs.

6. The method of claim 1, wherein, for each of the L weld locations, the W weld segments include a first group arranged parallel to one another in a first direction parallel to an outer edge of the stack including the external tabs and a second group arranged parallel to one another in a second direction perpendicular to the outer edge of the stack including the external tabs and overlapping the first group.

7. The method of claim 1, wherein the L weld locations are arranged in a row located parallel to and spaced from an outer edge of the stack including the external tabs.

8. The method of claim 1, wherein the L weld locations are arranged in a row located parallel to and overlapping an outer edge of the stack including the external tabs.

9. The method of claim 1, wherein the W weld segments in each of the L weld locations are created in a predetermined sequence without sequentially welding immediately adjacent ones of the W weld segments in each of the L weld locations.

10. The method of claim 1, wherein at least one of the anode current collector of the A anode electrodes and the cathode current collector of the C cathode electrodes is made of foil.

11. A method for joining external tabs of a battery cell to a terminal, comprising:

providing a battery cell stack including:

C cathode electrodes each including a cathode current collector, a cathode active layer arranged on the cathode current collector, and an external tab extending from the cathode current collector;

A anode electrodes including an anode current collector, an anode active layer arranged on the anode current collector, and an external tab extending from the anode current collector; and S separators, where C, S and A are integers greater than one; and arranging a stack of the external tabs of one of the C cathode electrodes and the A anode electrodes on a terminal; and laser welding W weld segments in each of L weld locations on the stack of external tabs of one of the C cathode electrodes and the A anode electrodes to join the external tabs of the one of the C cathode electrodes and the A anode electrodes to the terminal, where W and L are integers greater than one, wherein the L weld locations are created on the stack of external tabs in a predetermined sequence without sequentially welding immediately adjacent ones of the L weld locations.

12. The method of claim 11, wherein the L weld locations are created in a predetermined sequence including laser welding outer ones of the L weld locations before laser welding inner ones of the L weld locations.

13. The method of claim 11, wherein:

the stack of external tabs is trimmed at an acute angle to form a sloped edge, and the L weld locations are arranged in a row along the sloped edge.

14. A battery cell, comprising:

a terminal; and a battery cell stack including:

C cathode electrodes each including a cathode current collector, a cathode active layer arranged on the cathode current collector, and an external tab extending from the cathode current collector;

A anode electrodes including an anode current collector, an anode active layer arranged on the anode current collector, and an external tab extending from the anode current collector; and S separators, where C, S and A are integers greater than one, wherein a stack of the external tabs of one of the C cathode electrodes and the A anode electrodes is laser welded to the terminal, and wherein a laser weld between the stack of external tabs of one of the C cathode electrodes and the A anode electrodes and the terminal includes W weld segments in each of L weld locations, where W and L are integers greater than one wherein an entire length of each of the W weld segments extends through each external tab in the stack of external tabs of the one of the C cathode electrodes and the A anode electrodes.

15. The battery cell of claim 14, wherein, for each of the L weld locations, the W weld segments are arranged parallel to one another in at least one of a first diagonal direction and a second diagonal direction.

16. The battery cell of claim 14, wherein, for each of the L weld locations, the W weld segment are arranged parallel to one another in a first direction at least one of parallel and perpendicular to an outer edge of the stack including the external tabs of the one of the C cathode electrodes and the A anode electrodes.

17. The battery cell of claim 14, wherein the L weld locations are arranged in a row located parallel to and spaced from an outer edge of the stack including the external tabs.

18. The battery cell of claim 14, wherein the L weld locations are arranged in a row located parallel to and overlapping an outer edge of the stack including the external tabs.

19. The battery cell of claim 14, wherein:

the stack of external tabs is trimmed at an acute angle to form a sloped edge, and the L weld locations are arranged in a row along the sloped edge.

20. The battery cell of claim 14, wherein at least one of the anode current collector of the A anode electrodes and the cathode current collector of the C cathode electrodes is made of foil.

* * * * *